United States Patent Office 2,863,720
Patented Dec. 9, 1958

2,863,720

PROCESS FOR PREPARING SYNTHETIC MICA PRODUCT

Francis A. Barr, Merrick, N. Y., assignor to Sylvania Electric Products, Inc., a corporation of Massachusetts No Drawing. Application April 26, 1956
Serial No. 580,711

5 Claims. (Cl. 23—110)

My invention is directed toward synthetic mica structures and methods for making the same.

The term "mica" or "the micas" defines a group of hydrated alumino silicate minerals which have a high dielectric strength and which possess a characteristic analogous crystallographic sheet like structure. This structure is flexible and transparent and has a high degree of cleavability (i. e. the sheet like structure can be divided and subdivided into extremely thin sheets.)

Physically, mica is composed of sheets or layers of aluminum hydroxide and/or magnesium hydroxide sandwiched between two silica layers, this sequence of layers being repeated indefinitely to form mica sheet.

Mica is extensively used by the electrical industry, for example, as a dielectric material for capacitors, as electrode supports in electron tubes, and the like. However, it has certain inherent disadvantages. For example, at temperatures on the order of 800° C. and higher, mica becomes dehydrated and disintegrates. Further, mica, being a mineral, can take various forms, such as muscovite (potassium mica), phlogopite (magnesium mica) and biotite (magnesium-iron mica). Therefore, its properties are not uniform, for example, its dielectric constant attains a range of values rather than having one established value.

Attempts have been made to overcome these disadvantages by producing mica synthetically to provide a sheet like structure differing from the natural mica in that the hydroxyl ions contained in the hydroxide layers of natural mica are replaced by fluorine ions.

Such synthetic (fluorine) mica has been produced in the form of chunks containing microscopically sized mica crystals. These chunks are then broken down into minute flakes, for example, by grinding in aqueous media; these flakes are then permitted to settle out of such media onto a suitable surface (as for example a moving belt) in the form of a reconstituted mica sheet or mat; the sheet is dried; and finally a number of such sheets are stacked in a die and hot pressed to produce what is known to the art as a recrystallized hot pressed sheet of reconstituted synthetic mica.

Sheets of this type will not become dehydrated at elevated temperature. Moreover, the properties of these sheets are more nearly uniform than natural mica.

As compared to natural mica, however, this synthetic mica product is mechanically weak and further has unsatisfactory electrical properties. For example, the modulus of rupture for natural mica averages about 55,000 pounds per square inch; that of the synthetic product ranges between 8-15,000 p. s. i. The modulus of shear for natural mica ranges between 1000-2000 pounds per inch as contrasted to 93-185 pounds per inch for the synthetic product. Moreover, the dielectric strength of natural mica (2000-6000 volts per mil) is much larger than that of the synthetic product (300-450 volts per mil).

In my copending application, Serial No. 544,576 filed November 1, 1955, I disclosed a new process wherein synthetic mica sheet produced in a manner well known to the art, is treated with at least one mineralizer selected from the class of inorganic fluorine compounds which, while in contact with the mica sheet and heated, yield silicon tetrafluoride as a vapor phase. The treated sheet is not pressed. The resultant structure as compared to the known synthetic mica product exhibits sharply increased mechanical and dielectric strength.

The term "mineralizer" as used in the art defines compounds or elements which promote the formation of minerals. All minerals are characterized by a crystalline structure and it is believed that, during mineral formation, small crystalline particles are bonded together to produce the large crystals which constitute the crystalline structure. The action of mineralizers is not well understood, but it is believed that mineralizers promote this bonding action. Mineralizers are substances which either volatize completely or leave only a small trace of their constituents in the reacting system. Water, fluorine, and certain of its compounds, carbon and certain of its compounds, and sulphur and certain of its compounds, are known as mineralizers.

While it is not my intention to be bound by theory, I believe that the poor mechanical strength and low dielectric values of the known synthetic mica sheet result from the physical structure of the mica, as explained below. Prior to hot processing, the synthetic mica is composed of many small mica flakes; there are many grain boundaries and edges of synthetic mica flakes which must interact and chemically bond together before a product having satisfactory mechanical and dielectric properties can be obtained.

When this mica sheet is hot pressed in accordance with known techniques, and a sample of the hot pressed sheet is examined under a microscope, it will be found that the sample contains hairline cracks, pin holes and voids (i. e. is porous). It is my belief that these structural defects are the cause of the poor mechanical and electrical properties of the known synthetic mica product, and further, that these defects are produced because the mica flakes are bonded together mechanically rather than chemically.

In contradistinction, a sample of a hot pressed sheet, formed in accordance with the above described invention, when examined microscopically will be found to have far fewer structural defects. Accordingly, it appears that the use of a mineralizer causes the synthetic mica flakes to become chemically bonded to each other with the highly beneficial results indicated previously.

It will be seen that synthetic mica products produced in accordance with this process are structurally different from the known synthetic mica products and possess improved mechanical and electric properties. To differentiate between these two types of products, I define the synthetic mica products produced in accordance with this process as mineralized recrystallized hot pressed sheets of reconstituted synthetic mica.

It is an object of the present invention to improve the mechanical and dielectric properties of mineralized synthetic mica products.

Another object is to provide a new and improved process for producing mineralized synthetic mica products which are characterized by sharply increased mechanical and dielectric strength.

Still another object is to increase the mechanical and dielectric strength of mineralized and non-mineralized synthetic mica products through the use of processes utilizing a plurality of mineralizers selected from the class of inorganic fluorine compounds.

These and other objects of my invention will either be explained or will become apparent hereinafter.

In the above described process, only one mineralizer is used. When this mineralizer has a relatively low volatization temperature, most of the silicon tetrafluoride vapor is evolved before the mica is heated to the reaction temperature range (1200°–1340° C.); as a result, insufficient vapor is produced during the reaction period and the mica is only partially mineralized. On the other hand, if the mineralizer has a relatively high volatization temperature, the vapor is not evolved at a sufficiently high rate during the period in which the temperature of the mica is continuously raised to its reaction temperature and again, incomplete mineralization ensues.

In the present invention the synthetic mica sheet is treated with a plurality of mineralizers selected from the class of inorganic fluorine compounds which, while in contact with the mica sheet and heated, yield silicon tetrafluoride as a vapor phase. Each compound in this plurality of mineralizers has a different volatization temperature so selected that the vapor phase volatizes at a relatively low temperature and continues to volatize (at a more constant rate than obtainable with the use of a single compound) as the mica temperature is raised to the reaction temperature.

The volatization temperature of each compound so used cannot exceed the reaction temperature, otherwise this compound will not participate in the reaction. Consequently, each compound must have a different volatization temperature which does not exceed 1340° C.

When sheets so treated are hot pressed, it will be found that the mechanical and dielectric strength of the resultant structure are substantially improved as compared to that of the mineralized products produced in the manner outlined in the above identified copending application.

Illustrative embodiments of my invention will now be described in detail in the examples which follow.

*Example I*

Unfired reconstituted fluorphlogopite synthetic mica sheets ($KMg_3AlSi_3O_{10}F_2$) were placed in an aqueous suspension containing 16% concentration by weight of ammonium acid fluoride ($NH_4HF_2$), 2% by weight of sodium fluotitanate ($Na_2TiF_6$) and 2% by weight of aluminum fluoride ($AlF_3 \cdot H_2O$), until the sheet surfaces were completely saturated with the solution (about 5–7% by weight of the composite concentration were added to the sheets in this manner). The sheets were then air dried to a temperature of 110° C. The dried sheets were hot pressed at a temperature of 1335° C. and at a pressure of 2000 pounds per square inch for a period of 30 minutes.

These hot pressed sheets were then subjected to various well known tests and it was found that the average modulus of rupture was 23,000 pounds per square inch. Further, the modulus of shear was found to be 1475 pounds per inch of thickness and the dielectric strength of this material fell within the range 700–750 volts per mil.

*Example II*

The process of Example I was repeated using various temperatures within the range 1200°–1340° C., various pressures within the range 1000–3500 pounds per square inch, and firing periods within the range 10–90 minutes. The results were substantially the same as in Example I.

*Example III*

The process of Example I was repeated using various composite concentrations wherein the relative proportions of the acid fluoride, the fluotitanate and the aluminum fluoride were maintained as indicated in Example I. Specifically 1%, 10%, 15% and a saturated solution by weight of the composite concentration were used.

It was found that the samples treated with the saturated acid solution were overfired under the conditions outlined in Example I, while the samples treated with the 15% solution were fired properly and the samples treated with the 10% and 1% solution were underfired.

However, it was also found that if the firing temperature was increased, the samples treated with the 1% and 10% solution could be fired properly and, further, that if the firing temperature was decreased, the samples treated with the saturated solution could also be fired properly. Concentrations of less than 1% by weight of acid were found to be unsatisfactory.

*Example IV*

Example I was repeated using an aqueous suspension containing 17% by weight of magnesium fluosilicate ($MgSiF_6 \cdot H_2O$), 1.8% by weight of potassium fluoride (KF), and 1.5% by weight of potassium fluosilicate ($K_2SiF_6$). Substantially the same results were obtained.

*Example V*

Example I was repeated using an aqueous suspension containing 18% by weight of ammonium fluoride ($NH_4F$), and 2% by weight of potassium fluoaluminate ($K_3AlF_6$). Substantially the same results were obtained.

*Example VI*

Example I was repeated using an aqueous solution containing 19% by weight of ferrous-fluosilicate ($FeSiF_6 \cdot H_2O$), 1% by weight of calcium fluosilicate and 0.5% by weight of cadmium fluoride ($CdF_2$). The dielectric strength was reduced to 500–600 volts per mil by this technique. The results were otherwise substantially the same as in Example I.

I have concluded that any inorganic fluorine mineralizer which either decomposes under the conditions indicated to produce silicon tetrafluoride vapor (as in Examples IV and VI) or which reacts with the silica in the mica under the conditions indicated to form this vapor (as in Examples I, II, III, and V) can be used.

For example the fluosilicates of calcium, nickel, lithium and copper are inorganic decomposable fluorine mineralizers of the type described above, while barium acid fluoride, aluminum fluoride and sodium acid fluoride are inorganic reactive fluorine mineralizers of the type also described above.

While I have shown and pointed out my invention as applied above, it will be apparent to those skilled in the art that many modifications can be made within the scope and sphere of my invention as defined in the claims which follow.

What is claimed is:

1. A method for producing recrystallized hot pressed sheet of reconstituted synthetic mica which comprises the steps of saturating the surfaces of an unfired reconstituted synthetic mica sheet of the fluorine type with a liquid media containing a plurality of inorganic compounds selected from the class of mineralizers composed of a first group of fluorine compounds which, when the saturated sheet is hot pressed, decompose to produce silicon tetrafluoride vapor and a second group of fluorine compounds which, when the saturated sheet is hot pressed, react with the silica contained in the sheet to produce silicon tetrafluoride vapor, each compound in said plurality having a different volatization temperature which does not exceed 1340° C., said first group consisting of the fluosilicates of magnesium, potassium, calcium, nickel, lithium and copper, and the fluorides of potassium and cadmium said second group consisting of the fluorides of aluminum and ammonium, the acid fluorides of ammonium, barium and sodium, and fluotitanates of sodium and potassium; and hot pressing said saturated sheet at a temperature falling within the approximate range 1200° C.–1340° C. to produce said recrystallized sheet.

2. A method as set forth in claim 1, wherein said media is an aqueous media.

3. A method for producing recrystallized hot pressed sheet of reconstituted synthetic mica of the fluorine type which comprises the steps of saturating the surfaces of an unfired reconstituted synthetic mica sheet with an aqueous suspension of at least two inorganic compounds selected from the group of mineralizers composed of fluorine compounds which, when the saturated sheet is hot pressed, decompose to produce silicon tetrafluoride vapor, each of said selected compounds having a different volatization temperature which does not exceed 1340° C., said group consisting of the fluosilicates of magnesium, potassium, calcium, nickel, lithium and copper and the fluorides of potassium and cadmium; and hot pressing said saturated sheet at a temperature falling within the approximate range 1200° C.–1340° C. to produce said recrystallized sheet.

4. A method for producing recrystallized hot pressed sheet of reconstituted synthetic mica of the fluorine type which comprises the steps of saturating the surfaces of an unfired reconstituted synthetic mica sheet with an aqueous suspension of at least two inorganic compounds selected from the group of mineralizers composed of fluorine compounds which, when the saturated sheet is hot pressed, react with the silica contained in the sheet to produce silicon tetrafluoride vapor, each of said selected compounds having a different volatization temperature which does not exceed 1340° C., said group consisting of the fluorides of aluminum and ammonium, the acid fluorides of ammonium, barium and sodium and fluotitanates of sodium and potassium; and hot pressing said saturated sheet at a temperature falling within the approximate range 1200° C.–1340° C. to produce said recrystallized sheet.

5. A method for producing recrystallized hot pressed sheet of reconstituted synthetic mica of the fluorine type which comprises the steps of saturating the surfaces of an unfired reconstituted synthetic mica sheet with an aqueous solution of at least two inorganic compounds selected from the class of mineralizers composed of a first group of fluorine compounds which, when the saturated sheet is hot pressed, decompose to produce silicon tetrafluoride vapor and a second group of fluorine compounds which, when the saturated sheet is hot pressed, react with the silica contained in the sheet to produce silicon tetrafluoride vapor, each of said selected compounds having a different volatization temperature which does not exceed 1340° C., said first group consisting of the fluosilicates of magnesium, potassium, calcium, nickel, lithium and copper, and the fluorides of potassium and cadmium, said second group consisting of the fluorides of aluminum and ammonium, the acid fluorides of ammonium, barium and sodium, and fluotitanates of sodium and potassium; and hot pressing said saturated sheet at a temperature falling within the approximate range 1200° C.–1340° C. to produce said recrystallized sheet.

References Cited in the file of this patent

UNITED STATES PATENTS

| | | |
|---|---|---|
| 2,196,974 | Boughton et al. | Apr. 16, 1940 |
| 2,447,359 | Oakley | Aug. 17, 1948 |
| 2,675,853 | Hatch et al. | Apr. 20, 1954 |
| 2,704,261 | Comefero | Mar. 15, 1955 |
| 2,760,879 | McDaniel et al. | Aug. 28, 1956 |